United States Patent [19]

Inoue

[11] Patent Number: 4,856,650

[45] Date of Patent: Aug. 15, 1989

[54] OXYGEN ABSORBENT PACKAGE

[75] Inventor: Yoshiaki Inoue, Tokyo, Japan

[73] Assignee: Mitsubishi Gas Chemical Co., Inc., Japan

[21] Appl. No.: 112,264

[22] Filed: Oct. 26, 1987

[30] Foreign Application Priority Data

Oct. 27, 1986 [JP]  Japan .................................. 61-253759
Nov. 13, 1986 [JP]  Japan .................................. 61-268542
Mar. 10, 1987 [JP]  Japan .................................. 62-52963

[51] Int. Cl.$^4$ ............................................. B65D 81/26
[52] U.S. Cl. .................................. 206/204; 206/524.2; 206/524.6; 426/124; 428/137; 502/400
[58] Field of Search ............... 206/204, 205, 213.1, 206/484, 524.2; 426/107, 113, 124; 428/35, 137, 138; 502/400, 401, 406

[56] References Cited

U.S. PATENT DOCUMENTS

| | | | |
|---|---|---|---|
| 3,670,874 | 6/1972 | Brunner et al. | 206/205 |
| 4,287,995 | 9/1981 | Moriya | 215/228 |
| 4,297,402 | 10/1981 | Kinbara et al. | 428/35 |
| 4,332,845 | 6/1982 | Nawata et al. | 428/35 |
| 4,399,161 | 8/1983 | Nakamura et al. | 426/541 |
| 4,421,235 | 12/1983 | Moriya | 206/524.2 |
| 4,485,133 | 11/1984 | Ohtsuka et al. | 428/35 |
| 4,487,791 | 12/1984 | Komatsu et al. | 428/35 |
| 4,579,223 | 4/1986 | Otsuka et al. | 206/204 |
| 4,657,133 | 4/1987 | Komatsu et al. | 206/204 |
| 4,667,814 | 5/1987 | Wakamatsu et al. | 206/0.7 |

FOREIGN PATENT DOCUMENTS 56-162422  10/1981  Japan .
60-297784  12/1985  Japan .
1175739  12/1969  United Kingdom .
2068991  8/1981  United Kingdom .

OTHER PUBLICATIONS

Translation of Japanese Patent No. 58-64959, (4/83).
Translation of Japanese Patent No. 60-104600, (6/85).
Translation of Japanese Patent No. 62-156397, (7/11/87).
Abstract Bulletin of the Institute of Paper Industry, vol. 54, No. 4, Oct. 1983, Abstract No. 3794.
Chemical Abstracts, vol. 102, No. 14, Apr. 8, 1985, Abstract No. 114740w.

Primary Examiner—Jimmy G. Foster
Attorney, Agent, or Firm—Leydig, Voit & Mayer

[57] ABSTRACT

An oxygen absorbent package used for preservation or storage of foodstuff is disclosed. The package is partly or wholly formed with an air-permeable sheet obtained by making a sheet from plastic fiber, drying the sheet, impregnating it with a fluorine resin and pressing the resin-impregnated sheet by heated rolls. The obtained package has high proofness against water and oils. Use of the air-permeable sheet in combination with a specific porous composite film or porous low softening point resin film provides a package further improved in heat resistance, etc.

Furthermore, an oxygen absorbent package used for storage of a retort food is also disclosed.

28 Claims, 3 Drawing Sheets

OXYGEN ABSORBENT PACKAGE

FIELD OF THE INVENTION AND RELATED ART STATEMENT

1. Field of the Invention

This invention is directed to an oxygen absorbent package used for storage of foodstuff of high water content, foodstuff containing alcohols and foodstuff containing a large amount of oil, and is also directed to an oxygen absorbent package used for storage of retort foods.

2. Related Art Statement

Use of oxygen absorbents is known as a technique for storage of foodstuff. According to this technique, foodstuff to be stored and an air-permeable package packed with an oxygen absorbent are enveloped in a gas-barrier packaging material and the sealed system is brought into a substantially oxygen-free state to thereby prevent oxidation of packed foodstuff and development of bacteria or mold on or in such foodstuff (See U.S. Pat. Nos. 4,113,652, 4,104,192, 4,199,472, 4,127,503, 4,166,807 and 4,192,773). This technique is used for storage of a variety of foods.

There is also known a retort pouching technique for long-time preservation of foodstuff. This technique features heating of the packed foodstuff at 100°–150° C. for 2–80 minutes to kill the bacteria which causes putrefaction to thereby allow long-time storage of foodstuff. It has been, however, extremely difficult to exterminate even the spores of thermophilic bacteria in the retort food, and it has been quite probable that the spores of a bacterium would germinate and grow in the retort food to cause its deterioration, or that the foodstuff, especially the oil or fat contained in the foodstuff would be oxidized by oxygen present in the spaces in the retort pouch to change the taste or quality of foodstuff before the retort food is served to the consumers.

If the foodstuff storage technique which uses oxygen absorbents can be applied to the retort foods, it will become possible not only to inhibit germination and growth of the spores of thermophilic bacteria in retort foods but also prevent the oxidation of oil and fat and, accordingly, the change of taste of foodstuffs, thus realizing prolongation of the safe storage period of retort foods.

Generally, when the air-permeable packages used as oxygen absorbent packages are applied to the field of foodstuffs, it is essential that such packages satisfy the requirements for waterproofness, resistance to breakage and hygienic safety in addition to air permeability. Further, in case such packages are used for storage of foodstuff of high water content, foodstuff containing alcohols or foodstuff containing a large amount of oil, they are required to resist the adverse effects of alcohols and oils beside being waterproof. Heat resistance is also required for the packages when they are used for storage of retort foods.

As the materials used for the oxygen absorbent packages, there are known microporous films made of porous plastic materials, such as Celgard (Celanese Corp.), Nitto Flon NTF (Nitto Electric Industrial Co., Ltd.) and NF sheet (Tokuyama Soda Chemical Co.) and nonwoven fabrics made of polyethylene fiber, polyamide fiber, polyester fiber, polypropylene fiber or the like, such as Tyvek (E. I. Du Pont) and Spubond (Asahi Kasei Co., Ltd.).

These packaging materials, however, have the following defects.

(1) When contacted with foodstuff containing oil or alcohol, said packaging materials are impregnated with oil or alcohol from the portion contacted therewith.

(2) Since the sealing material is polyethylene of low softening point, the sealed portion may peel off to break the package when the package is applied to retort foods and subjected to heat sterilization.

(3) Oil or alcohol can penetrate into the packed substance to obstruct absorption of oxygen, making the oxygen absorbent unable to perform its food preserving activity.

For the improvement of resistance to oils and alcohols, Japanese Patent Application Kokai (Laid-Open) No. 64959/83 discloses a method in which the packaging material composed of a microporous film or nonwoven fabric is impregnated or coated with a fluorine resin. This method, however, has the problem that since the microporous film or nonwoven fabric used for the packaging material is hydrophobic, the fluorine resin applied would not spread all over the packaging material but would merely stay in the surface of the packaging material, thus imposing a limitation to the degree of resistance to oils and alcohols that the packaging material can provide. Further, since there locally exist the parts with large openings or pores in said microporous film or nonwoven fabric, even if it is impregnated or coated with a fluorine resin, oil or alcohol would enter through the parts with large openings and could penetrate the side of the packaging material or even into the oxygen absorbent packed therein.

When an oxygen absorbent package using paper made from fluorine resin-added natural pulp as a part of packaging material is contacted with an oil-containing moist food such as a doughnut or a fried fish ball, oil soaks into the packaging material along with water in a relatively short time. Thus, it is difficult to provide such oxygen absorbent package with satisfactory oil resistance in practical use.

Japanese Utility Model Publication No. 22048/84 discloses an oxygen absorbent package comprising a laminate package made by bonding a microporous film and a sheet having higher softening point than said film. This package, however, can not be applied to retort foods containing an oil or alcohol because the microporous film is not provided with resistance to oils and alcohols.

As viewed above, there has hitherto been available no oxygen absorbent package which can be applied to retort foods containing an oil or alcohol.

OBJECT AND SUMMARY OF THE INVENTION

In view of the above, the present inventor has made further studies for realizing an oxygen absorbent package which will not permit penetration of oil or alcohol into the package and can fulfill its function even if it is packed with retort foods containing an oil or alcohol along with water and subjected to heat sterilization.

As a result, the present inventor has confirmed that the sheet material obtained by wet processing plastic fiber such as polyethylene, polypropylene or like fiber alone followed by drying has no water resistance and sucks up water when contacted with water, but when such sheet material is hot pressed, it is provided with excellent air permeability and water resistance, and when this sheet material after drying is further impregnated with a fluorine resin in the form of an emulsion or solution and dried, the fluorine resin is adhered to the entire fiber, so that when this sheet material is again hot pressed, it is provided with not only air permeability and water resistance but also a high degree of resistance to alcohols and oils that could never be achieved with the conventional packaging materials. The present inventor found that the thus obtained sheet is suited for use as a material for forming an oxygen absorbent package.

It was further found that the incorporation of a specific reinforcing material for reinforcing the strength of the sheet can provide a sheet improved in strength against stress in the longitudinal direction.

The present inventors have also confirmed that a package bonded with a porous composite film (b) made by laminating a resin layer having a lower softening point than said sheet and a resin layer having a higher softening point than said sheet and perforating the laminate is provided with high heat resistance, eliminating any fear of breakage even under high temperatures, in addition to air permeability and water resistance, and also afforded such a high degree of resistance to alcohols and oils that could not be expected from the conventional packaging materials, and found that such sheet can ideally serve as an oxygen absorbent package for retort foods. The present invention was attained on the basis of these findings.

The present invention, in an aspect thereof, provides an oxygen absorbent package comprising an air-permeable sheet forming a part or whole of the packaging material of oxygen absorbent, the air-permeable sheet having been made by making a sheet from plastic fiber, drying the same, impregnating the sheet with a fluorine resin in the form of an emulsion or solution, drying the resin-impregnated sheet and then pressing it by heated rolls.

In another aspect of the present invention, there is provided an oxygen absorbent package in which the resin-impregnated sheet is reinforced with a reinforcing material.

The present invention further provides, in still another aspect thereof, an oxygen absorbent package using the resin-impregnated sheet bonded with a porous composite film or films as a laminate, in which the sheet may be bonded to a single piece of porous composite film or may be sandwiched between the porous composite films, the film being a perforated laminate sheet consisting of a resin layer having a lower softening point than the plastic fiber forming the sheet and a resin layer having a higher softening point than said plastic fiber, the porous composite film being bonded at its low softening point resin layer side to the air-permeable sheet, and an oxygen absorbent is packed in the package with the air-permeable sheet side being positioned on the inside.

BRIEF DESCRIPTION OF DRAWINGS

In the drawings, 20 indicates a low softening point resin layer (e.g. polyethylene layer), 30 a high softening point film layer (e.g. polyester film layer), 40 a composite film, 42 a porous composite film (e.g. nylon/high-density polyethylene film (sealed side)), and 90 a powdered oxygen absorbent.

DETAILED DESCRIPTION OF PREFERRED EMBODIMENTS

The plastic fiber used in this invention can be produced by various methods. For example, a polymer solution is flushed in a non-solvent under high-speed stirring to form fibers; shear is applied to the polymer solution in a polymerizer to directly form fibers; fibers are formed by flush spinning and then beaten (flushing methods); or an extrusion molded sheet is drawn in the longitudinal direction, split and then beaten (drawing method). Flushing methods are preferred.

As the plastic fiber forming the sheet (which may hereafter be referred to simply as plastic fiber) in this invention, there can be used the fiber made of one or more of the resins selected from polyolefins such as polyethylene and polypropylene, polyamides such as nylon, polyesters such as polyethylene terephthalate, and the like, preferably the fiber made of polyethylene or polypropylene, or the composite fiber composed of polyethylene/polypropylene, polyethylene/polyethylene terephthalate, polyethylene/polypropylene/polyethylene terephthalate, and the like. Such plastic fiber is preferably added with polyvinyl alcohol so that the fiber will be well dispersed in water in the course of sheet making. Since the pore opening of the sheet is preferably less than 50 $\mu$, it is desirable that the fiber width be as small as possible, usually less than 50 $\mu$, preferably less than 30 $\mu$. The preferred fiber length is usually 0.1 to 200 mm.

The plastic fiber is suspended in water, if necessary with an additive or additives such as dispersant, defoaming agent, etc. The plastic fiber suspension is introduced into a sheet machine, filtered by wire, suction dehydrated and then passed through a dryer to obtain a dry sheet material. The concentration of plastic fiber in its water suspension is not specifically defined in this invention, but in view of workability in the sheet making process, the fiber concentration is usually set in the range of 0.1 to 10% by weight, preferably 0.5 to 5% by weight. The time and temperature for drying the web are not critical as far as drying is affected so that the water content of the sheet material will become preferably less than 0.1%. The basis weight of the dry sheet material is set in the range of 5 to 300 g/m$^2$, preferably 20 to 150 g/m$^2$, by taking into consideration the air permeability of sheet material, its strength and expense. The thus obtained sheet material, although having air permeability, still has no waterproofness and is quite permeable to water.

Then said sheet material is immersed in or contacted with an emulsion formed by dispersing a fluorine resin in an aqueous solution or a solution formed by dissolving a fluorine resin in a solvent, thereby having said sheet material impregnated with a fluorine resin. Any fluorine resin can be used, however, it is preferred to use ethylene tetrafluoride resin, ethylene tetrafluoride-propylene hexafluoride copolymer, ethylene tetrafluoride-fluoroalkoxyethylene copolymer resin, ethylene chloride trifluoride resin or derivatives thereof. The amount of fluorine resin used is 0.1 to 10 parts by weight, preferably 0.5 to 5 parts by weight, to 100 parts by weight of plastic fiber.

The fluorine resin-impregnated sheet material is then pressed by heated rolls, whereby said sheet material is provided with resistance to penetration by water, oils and alcohols and becomes an "air-permeable sheet" referred to in this invention.

Pressing by heated rolls is preferably carried out by pressing the sheet material while heating it to a temperature at which the sheet surface is fused so that the plastic fibers therein will be fusion bonded at their crossing points. The temperature at which said pressing by heated rolls is conducted is usually 120°–140° C., preferably 125°–135° C., and the pressure is usually 0.5–6 kg/cm$^2$, preferably 3–5 kg/cm$^2$.

The thickness of the air-permeable sheet is usually 1 mm or less, preferably 0.2 mm or less.

In this invention, a reinforcing material is preferably laminated to the air-permeable sheet for increasing the strength of the package.

The reinforcing material usable in this invention includes the knits of filaments or strips made of plastic materials, for example, polyolefins such as polyethylene and polypropylene, polyamides such as nylon, polyesters such as polyethylene terephthalate, etc., and the fabric-like products obtained by fusion bonding, or fixing with a bonding agent the weft and warp of filaments or strips. Suitable additives such as pigment may be incorporated in the plastic reinforcing material.

These reinforcing materials are commercially available as they are sold under the names of Nisseki Warifu (Nisseki Synthetic Resin Products Mfd. Co.), Daiyacross (Diatex Corp.), Kurenet (Kuraray Co., Ltd.), Sofucross (Shin Nippon Sheeting Co., Ltd.), Sofunet (Shin Nippon Sheeting Co., Ltd.), etc.

An especially preferred reinforcing material is one using the yarns obtained by cutting to a width of 0.3–3 mm a stretched or non-stretched film formed by bonding a low-density polyethylene, ethylene-vinyl acetate copolymer or ethylene-acrylic ester copolymer having a softening point of 120° C. or below, preferably 115° C. or below, to both sides of a high-density polyethylene film, the yarns being interwoven into a lattice pattern of 3–50 yarns/inch widthwise and fusion bonded to each other.

The size and number of the yarns are suitably selected according to the required air permeability of the air-permeable sheet. The air permeability of the sheet, as measured in terms of Garley's permeability prescribed in JIS P-8117, is usually in the range of 1–5,000 sec/100 ml in$^2$, preferably 5–1,000 sec/100 ml in$^2$.

In the present invention, lamination of the fluorine resin-impregnated plastic fiber and said reinforcing material can be accomplished by a hot press using heated rolls. Therefore, in case of using a laminated combination of sheet and reinforcing material, it is expedient to employ a method in which the fluorine resin-impregnated and dried sheet made of plastic fiber is hot pressed by heated rolls while concurrently laminating the reinforcing material to the sheet.

In the present invention, a porous low softening point resin film or a composite film may be sealed to the air-permeable sheet. The composite film is preferably porous.

Preferred examples of porous low softening point resin film usable in this invention are perforated polyethylene film, vinyl acetate copolymer film and ionomer film.

The porous composite film used in this invention is further explained. This film is bonded to the air-permeable sheet for improving heat resistance and oil resistance of the packaging material. The porous composite film is a perforated composite film comprising a laminate of a resin layer having a lower softening point than the plastic fiber constituting the air-permeable sheet and a resin layer having a higher softening point than that plastic fiber.

The low softening point resin layer of the porous composite film serves as an adhesive layer for bonding the air-permeable sheet and the porous composite film.

The material used for the low softening point resin layer is not specifically defined except that such material must have a lower softening point than the plastic fiber of the air-permeable sheet, but it is preferred to use polyethylene, polypropylene, ethylene-vinyl acetate copolymer, ethyl acrylate-ethylene copolymer, ethylene-methyl methacrylate copolymer or ethylene-acrylic ester-maleic anhydride copolymer.

The high softening point resin layer of the porous composite film is intended to afford heat resistance to the packaging material. The material used for such high softening point resin layer is not specified saving that it must have a higher softening point than the plastic fiber of the air-permeable sheet, but nylon or polyethylene terephthalate is preferably used.

Lamination of low softening point resin layer and high softening point resin layer for forming said composite film is usually accomplished by dry lamination, extrusion lamination or coextrusion lamination.

The thickness of the composite film is not specified, but it is preferably less than 300 $\mu$, more preferably less than 100 $\mu$, in view of cut resistance and economy.

A light absorbing pigment or the like may be added to the film.

Any suitable method may be used for perforating the composite film and low softening point resin film, but usually a needle thrusting method, corona discharge method or laser beam irradiation method is used. In the present invention, the needle thrusting method which is capable of forming small openings or the laser beam irradiation method is preferred. The latter is especially preferred as this method is capable of uniformly forming a plurality of openings having a small size and providing a regular fracture section. According to this laser beam irradiation method, usually $CO_2$ laser beams or He-Ne laser beams with a power density of $1 \times 10^{-2}$ to $1 \times 10^8$ W/cm$^2$ are passed intermittently through a prescribed lens to irradiate the composite film for $1 \times 10^{-3}$ to $1 \times 10^{-7}$ second so that the irradiated part is perforated by the heat generated on absorbing the laser beams.

The diameter and number of the openings or pores formed in the composite film and low softening point resin film are so adjusted that the package obtained by bonding the air-permeable sheet and said porous composite film or low softening point resin film will have a Garley's permeability of 1 to 5,000 sec/100 ml in$^2$, preferably 5 to 1,000 sec/100 ml in$^2$. More specifically, the opening diameter is 10 mm or less, preferably 1 mm or less, and the number of the openings is more than 100 openings/m$^2$, preferably more than 10,000 openings/m$^2$, the porosity (open area per unit area) being 0.8 to 40%, preferably 1 to 30%.

Bonding of the porous composite film or low softening point resin film and the air-permeable sheet can be accomplished by hot press using heated rolls. For such bonding, therefore, it is expedient to employ a method in which the air-permeable sheet obtained by impregnating a sheet of plastic fiber with an emulsion or solution of a fluorine resin and then drying the same is hot pressed by heated rolls while laminating thereto the low softening point resin layer of the porous composite film.

The oxygen absorbent to be encapsulated in this invention is not limited to any specific types but any of those capable of absorbing oxygen is usable. Typically, the oxygen absorbents containing sulfites, hydrogen sulfites, dithionites, ferrous salts, hydroquinone, catechol, resorcinol, pyrogallol, gallic acid, Rongalit, ascorbic acid and/or its salts, isoascorbic acid and/or its salts, unsaturated fatty acid compounds, sorbose, glucose, lignin, dibutylhydroxytoluene, butylhydroxyanisol or the like, or the oxygen absorbents containing metal powder such as iron powder are used. Among them, the oxygen absorbents containing ascorbic acid and/or its salts, isoascorbic acid and/or its salts, unsaturated fatty acid compounds or iron powder are preferred. Those containing iron powder are especially preferred. Carbon dioxide generating type oxygen absorbents and carbon dioxide absorbing type oxygen absorbents are also usable.

As described above, the oxygen absorbent package of this invention is of a structure in which a part of whole of the package is constituted by an air-permeable sheet obtained by making a sheet from plastic fiber, impregnating the dried sheet with an emulsion or solution of a fluorine resin and hot pressing the resin-impregnated sheet, or of a structure in which a sheet prepared by laminating said air-permeable sheet and a reinforcing material is used as a part or whole of the packaging material. Also, said air-permeable sheet (which may hereinafter be represented by (a)) and a porous composite film (b) obtained by laminating a resin layer having a lower softening point than said plastic fiber and a resin layer having a higher softening point than said plastic fiber are bonded to each other with the low softening point resin layer of said film (b) serving as bonded side to form a packaging material, and this packaging material may be used as a part or whole of the oxygen absorbent package with said air-permeable sheet (a) being positioned on the inside of the package.

The following are the typical embodiments of oxygen absorbent packages according to this invention.

Figure 1:
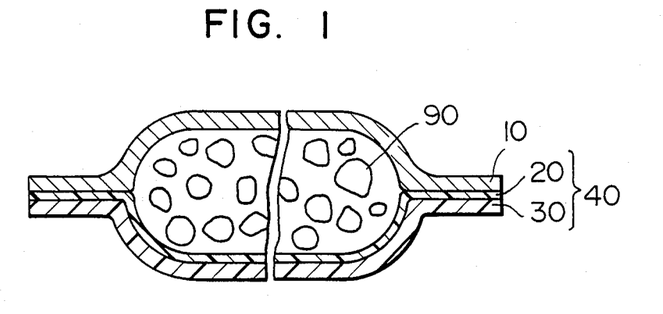
FIG. 1 is a sectional view showing the structure of an embodiment of the oxygen absorbent package according to this invention. The package is composed of an air-permeable sheet (incorporated with a fluorine resin) 10 and a composite film 40. The composite film 40 consists of a low softening point film layer 20 on the inside and a high softening point film layer 30 on the outside.

(1) An oxygen absorbent package comprising an air-permeable sheet (a) and a composite film (b) including a polyethylene layer such as nylon/polyethylene film or polyethylene terephthalate/polyethylene film, the polyethylene layer side of said composite film (b) being laminated to said sheet (a) with an oxygen absorbent disposed therebetween, the laminate being heat sealed edgewise so the oxygen absorbent is encapsulated therein. (See FIG. 1).

Figure 2:
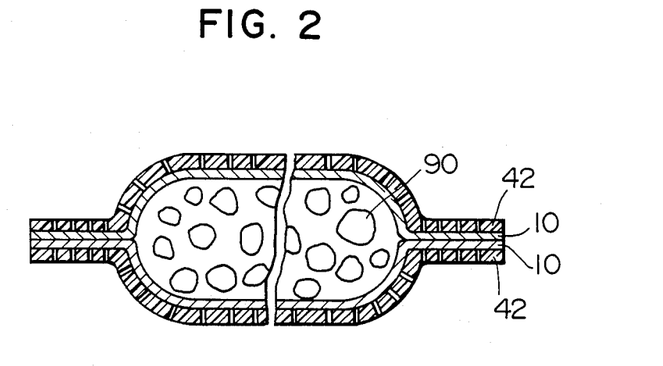
FIG. 2 is a similar view to FIG. 1, showing a package comprising a laminate of a porous composite film 42 and an air-permeable sheet 10.

(2) An oxygen absorbent package comprising two sheets of packaging material obtained by laminating an air-permeable sheet (a) to the low softening point resin layer side of a porous composite film (b) consisting of a resin layer having a higher softening point than the plastic fiber used for said air-permeable sheet and a resin layer having a lower softening point than said plastic fiber, said two sheets of packaging material being laminated with an oxygen absorbent disposed therebetween, said laminate being heat sealed edgewise to encapsulate the oxygen absorbent therein. (See FIG. 2).

Figure 3:
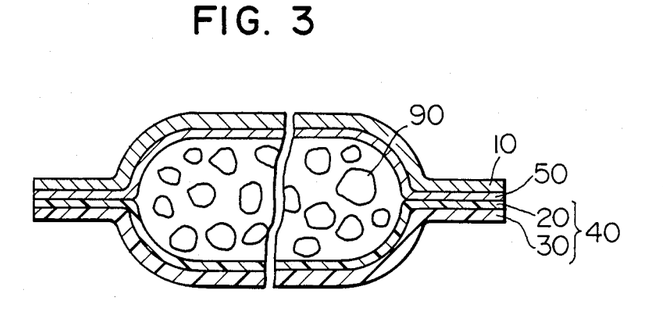
FIG. 3 is a similar view to FIG. 1, showing a package composed of a laminate of an air-permeable sheet 10 and a reinforcing material 50 on one side and a composite film 40 on the other side.

(3) An oxygen absorbent package comprising a laminate sheet (a) including of an air-permeable sheet and a reinforcing material, and a composite film (b) including a polyethylene layer such as nylon/polyethylene film or polyethylene terephthalate/polyethylene film, the polyethylene side of (b) being laminated to the reinforcing material side of (a) with an oxygen absorbent disposed therebetween, the laminate being heat sealed edgewise so that the oxygen absorbent is encapsulated therein. (See FIG. 3).

Figure 4:
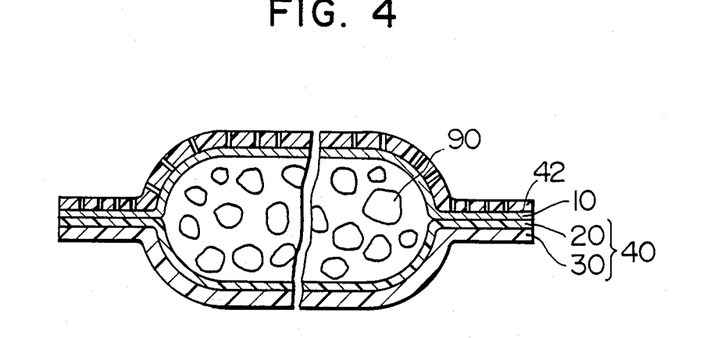
FIG. 4 is a similar view to FIG. 1, showing a package composed of a laminate of a porous composite film 42 and an air-permeable sheet 10 on one side and a composite film 40 on the other side.

(4) An oxygen absorbent package in which the air-permeable sheet side of a packaging material obtained by bonding a porous composite film (b) to an air-permeable sheet (a) is laminated to the high-density polyethylene side or polypropylene side of a composite film (c) such as nylon/high-density polyethylene film, polyethylene terephthalate/high-density polyethylene film or nylon/polypropylene film, with an oxygen absorbent disposed therebetween, and the laminate is heat sealed edgewise so as to encapsulate the oxygen absorbent in the package. (See FIG. 4).

Figure 5:
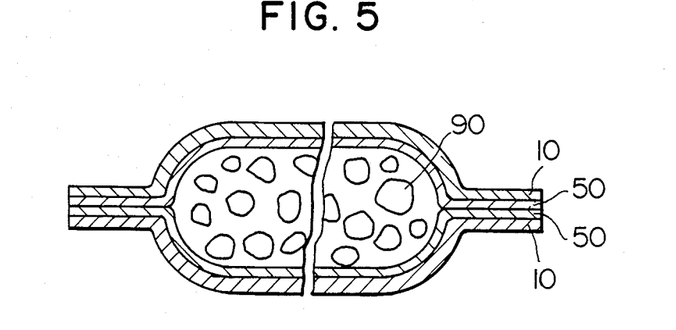
FIG. 5 is a similar view to FIG. 1, showing a package comprising a laminate of an air-permeable sheet 10 and a reinforcing material layer 50 which forms the inner layer.

(5) An oxygen absorbent package comprising a laminate sheet including of an air-permeable sheet and a reinforcing material, the laminate sheet being tucked in with the reinforcing material on the inside and heat sealed edgewise to encapsulate the oxygen absorbent therein. (See FIG. 5).

(6) An oxygen absorbent package comprising a packaging material obtained by laminating an air-permeable sheet (a) to the low softening point resin layer side of a porous composite film (b) including a resin layer having a higher softening point than the plastic fiber used for the air-permeable sheet and a resin layer having a lower softening point than the plastic fiber, said packaging material being tucked in with (a) on the inside and heat sealed edgewise to encapsulate the oxygen absorbent therein. (See FIG. 2).

Figure 6:
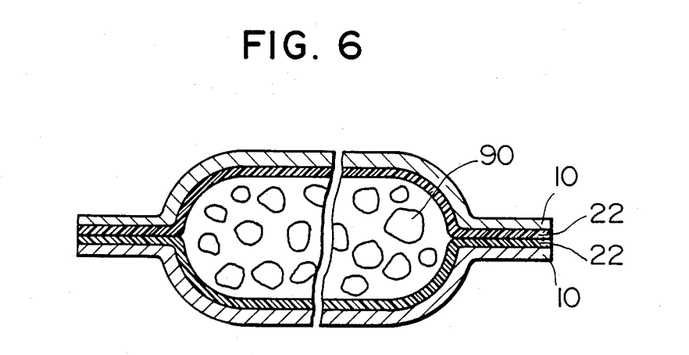
FIG. 6 is a similar view to FIG. 1, showing an oxygen absorbent package comprising a laminate of an air-permeable sheet 10 and a porous low softening point resin layer 22.

(7) An oxygen absorbent package comprising a laminate of an air-permeable sheet and a porous low softening point resin film, the laminate being tucked in with the low softening point resin film on the inside and heat sealed edgewise to encapsulate the oxygen absorbent therein. (See FIG. 6).

Figure 7:
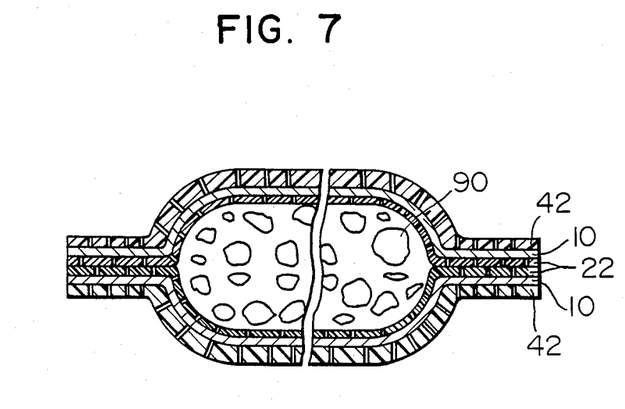
FIG. 7 is a similar view to FIG. 1, showing a package comprising a laminate of porous composite film 42/air-permeable sheet 10/porous low softening point resin layer 22.
Figure 8:
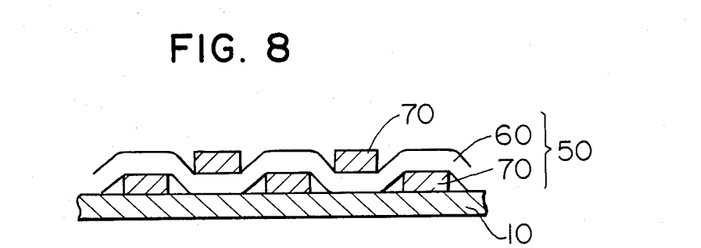
FIG. 8 is a sectional view showing the structure of a package comprising a laminate of an air-permeable sheet 10 and a reinforcing material 50. The reinforcing material 50 is composed of weft yarns 60 and warp yarns 70.
Figure 9:
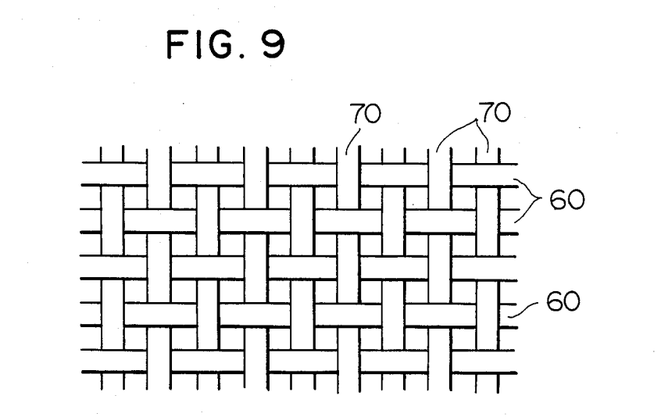
FIG. 9 shows an example of the structure of reinforcing material 50.

(8) An oxygen absorbent package comprising a pair of packaging materials prepared by laminating a porous plastic film (d) having a lower softening point than the plastic fiber constituting the air-permeable sheet (a) to the low softening point resin layer side of a porous composite film (b) with an air-permeable sheet (a) interposed therebetween, the pair of packaging materials being laminated with the porous plastic films (d) opposing each other and with an oxygen absorbent disposed therebetween, the laminate being then heat sealed edgewise to encapsulate the oxygen absorbent therein. (See FIG. 7).

The shape of the package is free to choose, but usually it is square.

The oxygen absorbent package of this invention is not only excellent in air permeability, impermeability to water, breakage resistance and hygienic safety but is also provided with high oil and alcohol resistance as well as heat resistance, so that the package of this invention is especially useful for storage or retort foods although such package is also applicable to other types of foodstuff.

A retort food can be prepared by encasing the foodstuff and the oxygen absorbent package of the present invention into a gas-barrier type package material (e.g., pouch) used for the retort food, sealing the material completely by an ordinary means, and heating the resulting structure at a temperature of 90° C. to 130° C. for 1 to 60 minutes. Thus, a retort food capable of being stored for a long period of time can be obtained.

EXAMPLES

The invention will be described in greater detail below by reference to the following examples.

EXAMPLE 1

(Production of sheet material and material for air-permeable sheet)

Various types of plastic fiber shown in Table 1 were dispersed in water to a concentration of 1% by weight. Each of the thus prepared suspensions of plastic fiber was introduced into a sheet machine to form a sheet. In this sheet making process, the plastic fiber suspension was dehydrated by a wire net to form a web and this web was held between a pair of rolls and compressed under a pressure of 1 kg/cm$^2$ for further dehydration. Thereafter, the web was dried at 100° C. for one minute to a water content of less than 0.1% to produce a sheet material having a basis weight of 90 g/m$^2$.

The types of plastic fiber and the compositional ratio of each type of plastic fiber used for producing the sheet material are shown in Table 1.

TABLE 1

| Symbol for sheet material | Type of plastic fiber used | Compositional ratio (%) |
| --- | --- | --- |
| A | Polyethylene fiber (av. fiber length: 0.9–1.3 mm, amorphous) | 100 |
| B | Polyethylene fiber (av. fiber length: 0.9–1.3 mm, amorphous) | 50 |
|   | Polyethylene-polypropylene composite fiber (diam. 0.2 mm, length 10 mm) | 50 |
| C | Polyethylene fiber (av. fiber length: 0.9–1.3 mm, amorphous) | 50 |

TABLE 1-continued

| Symbol for sheet material | Type of plastic fiber used | Compositional ratio (%) |
| --- | --- | --- |
|   | Polyester fiber (diam. 1.5 mm, length 10 mm) | 50 |

EXAMPLE 2

(Production of air-permeable sheet)

Each of the sheet materials obtained in Example 1 was impregnated with a dilute aqueous solution of a water and oil repellent Asahi guard AG 530 (available from Asahi Glass Co., Ltd.) (fluorine resin concentration: 2% by weight) in an amount of 25 parts by weight and 50 parts by weight to 100 parts by weight of sheet material, and then dried at 60° C. for 5 minutes.

The sheet material impregnated with said water and oil repellent was heated to 140° C. and passed through a pair of rolls loaded with a pressure of 6 kg/cm$^2$ at a speed of 10 m/min to produce an air-permeable sheet having the plastic fibers fusion bonded to each other.

The Garley's permeability of the thus obtained air-permeable sheets was measured according to the method prescribed in JIS P-8117. These air-permeable sheets were subjected to an oil resistance test by immersing the sheets in soybean oil and to an alcohol resistance test by immersing the sheet in 100% ethanol. The test results are shown in Table 2.

In the oil and alcohol resistance tests, the external appearance of each sheet was visually observed on a daily basis. The evaluations of visual appearance of each sheet as observed at the 14th day and 30th day of immersion are shown in Table 2.

As seen from Table 2, each of the sheets showed a Garley's permeability less than 50 sec/100 ml of air per in$^2$ and thus had very excellent air permeability. In the immersion tests, each of the sheets retained good external appearance even after 30 days of immersion.

COMPARATIVE EXAMPLE 1

An air-permeable sheet was produced by following the same procedure as Example 2 except that the sheet was not impregnated with a fluorine resin emulsion of water/oil repellent Asahi guard AG 530 (available from Asahi Glass Co., Ltd.).

The Garley's permeability of this air-permeable sheet was measured according to JIS P-8117. This sheet was also subjected to the same oil resistance test and alcohol resistance test as conducted in Example 2. The test results are shown in Table 2.

In the tests, the external appearance of the sheet was visually observed on a daily basis, and the evaluations of visual appearance as observed at the 14th day and 30th day of immersion are shown in Table 2.

COMPARATIVE EXAMPLE 2

An air-permeable sheet was produced in the same way as Example 2 except that a microporous film Celgard (available from Celanese Corp. of the U.S.) was used in place of the sheet material obtained in Example 1.

The Garley's permeability of this air-permeable sheet was measured according to JIS P-8117. This sheet was also subjected to the oil resistance test and alcohol resistance test, the test results being shown in Table 2.

In the tests, the external appearance of the sheet was visually observed on a daily basis, and the evaluations of appearance of the sheets as observed at the 14th day and 30th day of immersion are shown in Table 2.

TABLE 2

| | Symbol for sheet material | Amount of fluorine resin added *3 | | Permeability *5 | Oil resistance & alcohol resistance Visual appearance of sheet when immersed in: *4 | | | |
|---|---|---|---|---|---|---|---|---|
| | | Amount of Liquid | Amount of resin | | Soybean Oil | | 100% ethanol | |
| | | | | | 14th day | 30th day | 14th day | 30th day |
| Example 2 | A | 25 | 0.5 | 7 | 5 | 4 | 5 | 4 |
| | | 50 | 1 | 8 | 5 | 5 | 5 | 5 |
| | B | 25 | 0.5 | 9 | 5 | 4 | 5 | 4 |
| | | 50 | 1 | 10 | 5 | 5 | 5 | 5 |
| | C | 25 | 0.4 | 9 | 5 | 4 | 5 | 4 |
| | | 50 | 1 | 11 | 5 | 5 | 5 | 5 |
| Comp. Example 1 | A | 0 | 0 | 7 | 1 | 1 | 1 | 1 |
| | B | 0 | 0 | 9 | 1 | 1 | 1 | 1 |
| | C | 0 | 0 | 9 | 1 | 1 | 1 | 1 |
| Comp. Example 2 | M *1 | 0 | 0 | 15 | 1 | 1 | 1 | 1 |
| | | 50 | 1 | 19 | 2 | 1 | 2 | 1 |
| Comp. Example 3 | N *2 | 0 | 0 | 15 | 1 | 1 | 1 | 1 |
| | | 50 | 1 | 20 | 2 | 1 | 2 | 1 |
| Comparative Example 4 | A | 25 | 0.5 | 5 | 1 | 1 | 1 | 1 |
| | | 50 | 1 | 5 | 1 | 1 | 1 | 1 |
| | B | 25 | 0.5 | 5 | 1 | 1 | 1 | 1 |
| | | 50 | 1 | 5 | 1 | 1 | 1 | 1 |
| | C | 25 | 0.5 | 5 | 1 | 1 | 1 | 1 |
| | | 50 | 1 | 5 | 1 | 1 | 1 | 1 |

(Notes)
*1 M: microporous film Celgard (Celanese Corp., U.S.)
*2 N: nonwoven fabric Tyvek (E. I. Du Pont, U.S.)
*3 Parts by weight to 100 parts by weight of sheet
*4 Evaluations of visual appearance of sheet after 14 days and 30 days of immersion:
5 No impregnation of oil or ethanol in the package.
4 Oil or ethanol was impregnated at a part of the package.
3 Oil or ethanol was impregnated partially in the package.
2 Oil or ethanol was impregnated at most part of the package.
1 Oil or ethanol was impregnated all over the package.
*5 Garley's permeability, sec/100 ml in$^2$ visual appearance as observed at the 14th day and 30th day of immersion are shown in Table 2.

COMPARATIVE EXAMPLE 3

An air-permeable sheet was produced by following the process of Example 2 except that a nonwoven fabric Tyvek (available from E. I. Du Pont) was used in place of the sheet material obtained in Example 1.

The Garley's permeability of this sheet was measured according to JIS P-8117, and the sheet was also subjected to the oil resistance test and alcohol resistance test, obtaining the results shown in Table 2.

In the tests, the external appearance of the sheet was visually observed on a daily basis, and the evaluations of visual appearance as observed at the 14th day and 30th day of immersion are shown in Table 2.

COMPARATIVE EXAMPLE 4

Each of the sheet materials obtained in Example 1 was impregnated with a dilute aqueous solution of a water and oil repellent Asahi guard AG 530 (available from Asahi Glass Co., Ltd.) in an amount of 25 parts by weight or 50 parts by weight to 100 parts by weight of sheet material, and then dried at 60° C. for 5 minutes.

The Garley's permeability of the thus obtained air-permeable sheets was measured by the method prescribed in JIS P-8117. The sheets were also subjected to an oil resistance test by immersing them in soybean oil and to an alcohol resistance test by immersing the sheets in 100% ethanol. The test results are shown in Table 2.

In the oil resistance test and alcohol resistance test, the external appearance of the sheet was visually observed on a daily basis, and the evaluations of visual appearance of the sheets as observed at the 14th day and 30th day of immersion are shown in Table 2.

EXAMPLE 2

(Production of oxygen absorbent package)

Each of the air-permeable sheets obtained in Example 2 and cut to a size of 40×40 mm and an equally sized composite film consisting of 12 μ thick polyester and 45 μ thick polyethylene were placed one on the other with 3 g of an iron-based oxygen absorbent (oxygen absorbing capacity: 600 ml) disposed there between, and the sheet and film were heat sealed edgewise by heating under pressure at 130° C. for 3 seconds so as to encapsulate the oxygen absorbent.

Each of the thus produced oxygen absorbent packages was put into a pouch made of a vinylidene chloride-coated stretched nylon/polyethylene laminate film in which 70 g of fried fish balls and 250 ml of air were also contained, and the pouch was sealed and stored at 25° C.

The oxygen removal time (the time required till the oxygen concentration in the pouch became 0.1% after start of storage) was measured. Also, the external appearance of the oxygen absorbent package was visually observed to examine the state of oil impregnation. The state of fried fish balls in the pouch was also observed. The results are shown in Table 3.

COMPARATIVE EXAMPLE 5

The oxygen absorbent packages were produced in the same way as Example 3 except that the air-permeable sheet obtained in Comparative Example 1 was used in place of the air-permeable sheet obtained in Example 2, and these packages were subjected to the same tests as conducted in Example 3. The results are shown in Table 3 along with the results of Example 3.

COMPARATIVE EXAMPLE 6

The oxygen absorbent packages were produced by following the procedure of Example 3 except that the air-permeable sheet obtained in Comparative Example 2 was used in place of the air-permeable sheet obtained in Example 2, and the thus produced packages were subjected to the same tests as conducted in Example 3. The results are shown in Table 3.

COMPARATIVE EXAMPLE 7

The oxygen absorbent packages were produced according to Example 3 but by using the air-permeable sheet obtained in Comparative Example 3 in place of the air-permeable sheet obtained in Example 2, and the thus obtained packages were subjected to the tests of Example 3. The results are shown in Table 3.

COMPARATIVE EXAMPLE 8

The oxygen absorbent packages were produced according to Example 3 by using the air-permeable sheet obtained in Comparative Example 4 in place of the air-permeable sheet obtained in Example 2, and these packages were subjected to the tests of Example 3. The results are shown in Table 3.

As seen from Table 3, all of the oxygen absorbents of Comparative Examples 5–8 have lost their oxygen absorbing capacity in 7 days of storage.

EXAMPLE 4

An air-permeable sheet was produced according to the method of Example 2 by using the sheet material A obtained in Example 1 (see Table 1). As the fluorine resin source, Asahi guard AG-530 (fluorine resin concentration: 2%) was used in an amount of 50 parts by weight to 100 parts by weight of sheet material (the amount of fluorine resin added: 1 part by weight to 100 parts by weight of sheet material).

The air-permeable sheet thus obtained and each of the reinforcing materials made by plain weaving the yarns obtained by cutting an LDPE (low-density polyethylene, m.p. 105° C.)/HDPE (high-density polyethylene)/LDPE film to various sizes and numbers were bonded to each other by passing them through the heated rolls of 120° C. under a pressure of 0.5 kg/cm$^2$ at a rate of 40 m/min. The tear strength and Garley's permeability of the obtained laminate sheets were measured. The results are shown in Table 4. By way of comparison, the tear strength and Garley's permeability of said air-permeable sheet with no said reinforcing material laminated thereto were also measured and shown in Table 4.

TABLE 4

| Run No. | Reinforcing material *3 | | | Permeability *1 | Tear strength *2 (g) | |
|---|---|---|---|---|---|---|
| | Yarn size (mm) | Number of yarns | | | Longitudinal | Transverse |
| | | Warp | Weft | | | |
| 1 | 2.5 | 9 | 9 | 40 | 1700 | 1700 |

TABLE 3

| | | Air-permeable sheet | | | Oxygen absorbent package Change with time | | | | |
|---|---|---|---|---|---|---|---|---|---|
| | | Amount of fluorine resin added *3 | | Oxygen removal time (hr) | Visual appearance of oxygen absorbent package *4 | | | State of food *5 | |
| | Symbol for sheet material | Amount of liquid | Amount of resin | | Days of storage | | | | |
| | | | | | 1 | 3 | 7 | 3 | 7 |
| Example 3 | A | 25 | 0.5 | 10 | 5 | 5 | 4 | | |
| | | 50 | 1 | 10 | 5 | 5 | 5 | | |
| | B | 25 | 0.5 | 10 | 5 | 5 | 4 | | |
| | | 50 | 1 | 10 | 5 | 5 | 5 | | |
| | C | 25 | 0.5 | 10 | 5 | 5 | 4 | | |
| | | 50 | 1 | 10 | 5 | 5 | 5 | | |
| Comp. Example 5 | A | 0 | 0 | 10 | 1 | 1 | 1 | X | X |
| | B | 0 | 0 | 10 | 1 | 1 | 1 | X | X |
| | C | 0 | 0 | 10 | 1 | 1 | 1 | X | X |
| Comp. Example 6 | M *1 | 0 | 0 | 11 | 1 | 1 | 1 | X | X |
| | | 50 | 1 | 11 | 2 | 1 | 1 | X | X |
| Comp. Example 7 | N *2 | 0 | 0 | 11 | 1 | 1 | 1 | X | X |
| | | 50 | 1 | 11 | 2 | 1 | 1 | X | X |
| Comparative Example 8 | A | 25 | 0.5 | 10 | 1 | 1 | 1 | X | X |
| | | 50 | 1 | 10 | 1 | 1 | 1 | X | X |
| | B | 25 | 0.5 | 10 | 1 | 1 | 1 | X | X |
| | | 50 | 1 | 10 | 1 | 1 | 1 | X | X |
| | C | 25 | 0.5 | 10 | 1 | 1 | 1 | X | X |
| | | 50 | 1 | 10 | 1 | 1 | 1 | X | X |

(Notes)
*1 M: microporous film Celgard (Celanese Corp.)
*2 N: nonwoven fabric Tyvek (E. I. Du Pont)
*3 Parts by weight to 100 parts by weight of sheet
*4 Evaluations of visual appearance of oxygen absorbent packages:
  5 No impregnation of oil in the air-permeable sheet side of oxygen absorbent package.
  4 Oil was impregnated in less than 1/10 of the air-permeable sheet side of oxygen absorbent package.
  3 Oil was impregnated in 1/10 to 1/3 of the air-permeable sheet side of oxygen absorbent package.
  2 Oil was impregnated in 1/3 to 2/3 of the air-permeable sheet side of oxygen absorbent package.
  1 Oil was impregnated in more than 2/3 of the air-permeable sheet side of oxygen absorbent package.
*5 State of food in the pouch under storage:
  No sign of putrefaction.
  X Putrefied.

TABLE 4-continued

| Run No. | Reinforcing material *3 | | | Permeability *1 | Tear strength *2 (g) | |
|---|---|---|---|---|---|---|
| | Yarn size (mm) | Number of yarns | | | Longitudinal | Transverse |
| | | Warp | Weft | | | |
| 2 | 2.5 | 7 | 7 | 25 | 1400 | 1400 |
| 3 | 2.5 | 5 | 5 | 20 | 1100 | 1100 |
| 4 | 1.5 | 9 | 9 | 20 | 1000 | 1000 |
| 5 | 0.5 | 9 | 9 | 10 | 700 | 700 |
| 6 | None | | | 7 | 60 | 100 |

*1 Garley's permeability measured by the method of JIS P-8117. Unit: sec/100 ml in².
*2 Measured according to the method of JIS P-8116.
*3 Number of yarns per in².

EXAMPLE 5

Each of the air-permeable sheets obtained in Example 4 (reinforcing material-laminated sheets) cut to a size of 40×40 mm and a polyester (12 $\mu$ thick)/polyethylene (45 $\mu$ thick) composite packaging material cut to the same size as the air-permeable sheet were joined to each other with the reinforcing material side of the air-permeable sheet opposing the polyethylene side of the composite packaging material, then an oxygen absorbent mainly composed of iron and having an oxygen absorbing capacity of 600 ml was disposed therebetween, and the joined sheet and packaging material were heat sealed edgewise by heating under pressure at 130° C. for 3 seconds so as to encapsulate the oxygen absorbent.

Each of the thus obtained oxygen absorbent packages was put into a polyvinylidene chloride-coated stretched nylon/polyethylene laminate pouch (KON/PE pouch) together with 70 g of fried fish balls and 250 ml of air, and the pouch was sealed and stored at 25° C.

The oxygen removal time (the time required till the oxygen concentration became 0.1% after start of storage) was measured. Also, external appearance of each oxygen absorbent package was visually observed to examine the state of oil impregnation. The state of fried fish balls in the pouch was also observed. Observation of external appearance of the packages and the state of fried fish balls was conducted on a daily basis. The results are shown in Table 5.

EXAMPLE 6

(Production of air-permeable sheets)

The sheet materials (A, B and C) obtained from Example 1 were impregnated with a dilute aqueous solution of water/oil repellent Asahi guard AG-530 (available from Asahi Glass Co., Ltd.) in an amount of 50 parts by weight to 100 parts by weight of sheet material (fluorine resin concentration: 2% by weight) and then dried at 60° C. for 5 minutes to obtain the air-permeable sheets (symbolized as A, B and C in correspondence to Table 1).

(Preparation of porous composite films)

The porous composite films were prepared by laminating various types of high softening point resin films and low softening point resin films and perforating the laminates to a prescribed opening diameter and a prescribed number of openings by laser beam irradiation or needle thrusting. The structural details of the respective porous composite films are shown in Table 6.

TABLE 6

| Film No. | Structure of porous composite film | | | | |
|---|---|---|---|---|---|
| | High softening point resin | Low softening point resin | Perforating means | Opening diameter (mm) | Number of openings per m² |
| I | NY 15 $\mu$ | LDPE 40 $\mu$ | Laser beams | 0.15 | 1000 × 10³ |
| II | NY 15 $\mu$ | PP 40 $\mu$ | Laser beams | 0.15 | 1000 × 10³ |
| III | NY 15 $\mu$ | LDPE 40 $\mu$ | Laser beams | 0.3 | 400 × 10³ |
| IV | PET 12 $\mu$ | LDPE 40 $\mu$ | Laser beams | 0.15 | 1000 × 10³ |
| V | NY 15 $\mu$ | LDPE 40 $\mu$ | Laser beams | 0.15 | 10 ×10³ |
| VI | NY 15 $\mu$ | PP 40 $\mu$ | Needle | 0.3 | 1 × 10³ |

(Production of oxygen absorbent packaging material)

The thus obtained air-permeable sheets (A–C) and porous composite films (I–VI) were combined, with the low softening point resin side of the composite film attached to the air-permeable sheet, and they were passed through a pair of heated rolls of 125° C. under a

TABLE 5

| Run No. | Reinforcing material | | | Oxygen removal time (hr) | Visual appearance of packaging material | | | State of food | |
|---|---|---|---|---|---|---|---|---|---|
| | Yarn size (mm) | Number of yarns | | | 1st day | 3rd day | 7th day | 3rd day | 7th day |
| | | Warp | Weft | | | | | | |
| 1 | 2.5 | 9 | 9 | 20 | 5 | 5 | 5 | | |
| 2 | 2.5 | 7 | 7 | 16 | 5 | 5 | 5 | | |
| 3 | 2.5 | 5 | 5 | 10 | 5 | 5 | 5 | | |
| 4 | 1.5 | 9 | 9 | 14 | 5 | 5 | 5 | | |
| 5 | 0.5 | 9 | 9 | 10 | 5 | 5 | 5 | | |

Notes:
(1) The number of yarns in the reinforcing material shown in Table 5 is that per in².
(2) Evaluation of visual appearance of packaging material:
5 No impregnation of oil or ethanol in the packaging material.
4 Oil or ethanol was impregnated at a part of the packaging material.
3 Oil or ethanol was impregnated partially in the packaging material.
2 Oil or ethanol was impregnated in most part of the packaging material.
1 Oil or ethanol was impregnated all over the packaging material.
(3) Evaluation of the state of food:
 No abnormality.
X Putrefied.

pressure of 3 kg/cm² at a rate of 40 m/min to produce the packaging materials.

The Garley's permeability of each of said air-permeable sheets was measured according to JIS P-8117. The results are shown in Table 7.

COMPARATIVE EXAMPLE 9

A packaging material was produced in the same way as Example 6 except that a microporous film Celgard (available from Celanese Corp., U.S.) was used in place of the sheet material obtained in Example 1.

The Garley's permeability of this packaging material as measured according to JIS P-8117 is also shown in Table 7.

TABLE 7

| | Run No. | Packaging material Air-permeable sheet | Porous composite film | Permeability *1 |
|---|---|---|---|---|
| | 1 | A | I | 22 |
| | 2 | B | I | 21 |
| | 3 | C | I | 23 |
| Example | 4 | B | II | 22 |
| 6 | 5 | B | III | 15 |
| | 6 | B | IV | 21 |
| | 7 | B | V | 3000 |
| | 8 | B | VI | 100 |
| Comp. Example 9 | | | I | 25 |

*1 Garley's permeability measured according to JIS P-8117. Units: sec/100 ml in².

EXAMPLE 7

Each pair of the packaging materials produced as described above by bonding said porous composite films and air-permeable sheets obtained in Example 6 and cut to a size of 40×40 mm were joined to each other with their air-permeable sheet sides opposing each other, and after disposing therebetween an oxygen absorbent mainly composed of iron powder and having an oxygen absorbing capacity of 600 ml, the joined packaging materials were heat sealed edgewise at 170° C. for 3 seconds to encapsulate the oxygen absorbent. The oxygen removal time, oil resistance and heat resistance of the thus obtained oxygen absorbent packages were measured. The results are shown in Table 8.

Measurement of oxygen removal time:

Each of the oxygen absorbent packages was put into a KON (polyvinylidene chloride-coated stretched nylon, 15 μ thick)/PE (40 μ thick) pouch together with 0.5 liter of air, followed by sealing of the pouch, and the time required for the oxygen concentration in the pouch to reach 0.1% after storage at 25° C. was measured.

Determination of oil resistance:

The amount of oil impregnated into the packaging material after one-day immersion in soybean oil was measured. The external appearance of the packaging material was also visually observed.

Determination of heat resistance:

The time till the pouch was broken after being immersed in soybean oil of 120° C. was measured.

COMPARATIVE EXAMPLE 10

An oxygen absorbent package was produced by following the same procedure as Example 7 except that the packaging material obtained in Comparative Example 9 was used in place of the packaging material obtained in Example 6, and this package was subjected to the same measurements as described above. The results are shown in Table 8 along with the results of Example 7.

TABLE 8

| | | Packaging material | | Oxygen removal | Oil resistance of packaging material | | Heat resis- |
|---|---|---|---|---|---|---|---|
| | Run No. | Air-permeable sheet | Porous composite film | time (hr) | Amount of oil impregnated (mg) | Visual appearance *1 | tance (min.) |
| Example 7 | 1 | A | I | 10 | 7–17 | | >30 |
| | 2 | B | I | 10 | 6–15 | | >30 |
| | 3 | C | I | 10 | 10–21 | | >30 |
| | 4 | B | II | 10 | 6–17 | | >30 |
| | 5 | B | III | 9 | 10–25 | | >30 |
| | 6 | B | IV | 10 | 7–17 | | >30 |
| | 7 | B | V | 24 | 4–12 | | >30 |
| | 8 | B | VI | 13 | 6–60 | | >30 |
| Comp. Example 10 | | | I | 10 | 1000–2500 | X | >30 |

*1 Evaluation of visual appearance of packaging material:
 : No abnormality
X: Oil was impregnated in the entirety of packaging material.

EXAMPLE 8

200 g of meat balls inoculated with a thermophilic bacterium *Bacillus coagulans* were put into a 15 μ nylon/12 μ aluminum foil/30 μ polypropylene pouch along with each of the oxygen absorbent packages obtained in Example 3, followed by heat sterilization with steam of 1.46 kg/cm² (110° C.) for 15 minutes. After cooling, the pouch was kept in storage at 25° C. The state of the food and the external appearance of the oxygen absorbent package in the storage period were observed. The results are shown in Table 9.

COMPARATIVE EXAMPLE 11

The same process and the same test as conducted in Example 8 were repeated except that the oxygen absorbent package of Comparative Example 10 was used in place of the oxygen absorbent package of Example 7. The results are shown in Table 9.

As seen from Table 9, in the case of Comparative Example 11, oil was impregnated in the packaging material and the oxygen absorbent was devoid of the oxygen absorbing ability on the 7th day of storage.

TABLE 9

| | Run No. | Packaging material - Air-permeable sheet | Packaging material - Porous composite film | State of food *1 - 7th day | State of food *1 - 14th day | State of food *1 - 21st day | Visual appearance of oxygen absorbent package on the 7th day of storage |
|---|---|---|---|---|---|---|---|
| Example 8 | 1 | A | I | − | − | − | No abnormality |
| | 2 | B | I | − | − | − | " |
| | 3 | C | I | − | − | − | " |
| | 4 | B | II | − | − | − | " |
| | 5 | B | III | − | − | − | " |
| | 6 | B | IV | − | − | − | " |
| | 7 | B | V | − | − | − | " |
| | 8 | B | VI | − | − | − | " |
| Comp. Example 11 | | | I | −+ | + | ++ | Oil was impregnated all over the surface |

*1 Evaluation of the state of food:
−: No abnormality.
+: Partly putrefied.
++: Entirely putrefied.

EXAMPLE 9

(Production of oxygen absorbent package)

A 1 wt% suspension of polyethylene fibers having a length of 0.9–1.3 mm and an average width of 0.01 mm was introduced into a sheet machine. First, water was removed from the plastic fiber suspension by a wire net to form a web and this web was held between a pair of rolls and compressed under a pressure of 1 kg/cm$^2$ for further dehydration. Thereafter, the web was dried at 100° C. for one minute to produce a sheet material with a water content of less than 0.1% and a basis weight of 90 g/m$^2$. This sheet material was then impregnated with a dilute aqueous solution of Asahi guard AG 530 (a water and oil repellent, mfd. and sold by Asahi Glass Co., Ltd.) (fluorine resin concentration in the solution being 2% by weight) in an amount of 50 parts by weight to 100 parts by weight of said sheet material, and the impregnated sheet material was dried at 60° C. for 5 minutes to obtain an air-permeable sheet.

To this air-permeable sheet was attached the LDPE (low-density polyethylene) side of a composite film consisting of a 12 μ thick PET (polyethylene terephthalate) film and a 40 μ thick LDPE film and perforated by the irradiation of CO$_2$ laser beams with a power density of 30 W/cm$^2$ for a period of $1 \times 10^{-5}$ seconds, and the attached air-permeable sheet and composite film were passed between a pair of rolls of 125° C. under a pressure of 3 kg/cm$^2$ at a speed of 40 m/min and thereby bonded to each other to produce a packaging material.

The Garley's permeability of this packaging material as determined according to the method of JIS P-8117 was 22 sec/100 ml in$^2$. Two pieces of the packaging material cut to a size of 40×40 mm were out together with the air-permeable sheet side positioned on the inside, and after placing therebetween an oxygen absorbent mainly composed of iron powder and having an oxygen absorbing capacity of 600 ml, the two pieces of packaging material were heat sealed edgewise at 170° C. for 3 seconds to produce an oxygen absorbent package.

Food storage test 200 g of meat balls inoculated with a heat-resistant bacterium Bacillus coagulans (10$^4$ cells/g) were placed in a pouch of 15 μ nylon/12 μ aluminum foil/30μ polypropylene along with said oxygen absorbent package and heat sterilized by steam of 1.46 kg/cm$^2$ (110° C.) for 15 minutes. After cooling, the sealed pouch containing the meat balls and oxygen absorbent package was stored at 25° C., and the change with time of bacillus count in the food and the change with time of peroxide value of the oil and fat contained in the food during the period of storage were measured.

The results are shown in Table 10.

COMPARATIVE EXAMPLE 12

The same test as described above was conducted by replacing the oxygen absorbent package with a commercially available package. The results are shown in Table 10 along with the test results of Example 9.

As seen from Table 10, in the case of Comparative Example 12, the food in the pouch was putrefied and inedible on the 21st day of storage.

In the present Example, the oxygen concentration in the gas-barrier pouch was less than 0.1% within one day of storage.

TABLE 10

| | | | Example 9 | Comp. Example 12 |
|---|---|---|---|---|
| Bacillus count in food cells/g | Before heat treatment | | 10$^4$ | 10$^4$ |
| | Immediately after heat treatment | | 3 | 3 |
| | Change with time during storage | 7th day | 5.1 × 10 | 4.5 × 10$^2$ |
| | | 14th day | 8.7 × 10$^2$ | 6.8 × 10$^4$ |
| | | 21st day | 1.5 × 10$^4$ | 1.0 × 10$^7$ |
| Change with time of peroxide value of oil & fat contained in food | | 7th day | 10 | 15 |
| | | 14th day | 10 | 20 |
| | | 21st day | 10 | 30 |

As apparent from the embodiments described above, the oxygen absorbent package of this invention is characterized by the use of an air-permeable sheet prepared by impregnating a fluorine resin in a sheet of plastic fiber and then hot pressing the sheet and by encapsulating an oxygen absorbent in a packaging material formed from the air-permeable sheet by bonding, if necessary, a reinforcing material thereto, so that the oxygen absorbent package of this invention has its own merits such as stated below which are absent in the conventional oxygen absorbent packages.

In the case of the conventional fluorine resin-added packages, when they are contacted with a 10–50% ethanol solution, the ethanol solution is impregnated into the packaging material, but the package of this invention remains free of impregnation of ethanol even if immersed in 100% ethanol.

When an oxygen absorbent package using the conventional fluorine resin-added packaging material is immersed in a tempura (frying) oil, the oil is impregnated into the packaging material in one to three days and the packaged foodstuff is seen through the packaging material. The package of this invention shows no change at all in external appearance of the packaging material even when kept immersed in a tempura oil for 14 days.

Further, when the conventional oxygen absorbent packages are contacted with an oil-containing food such as doughnut, the oil infiltrates into the package from the contact area, interrupting absorption of oxygen, so that oxygen is not removed perfectly from within the sealed package, causing the packaged food to gather mold. The package of this invention does not allow infiltration of oil into the inside thereof, so that it retains its normal oxygen removing performance and can keep the freshness of the packaged food.

The tear strength of the sheet with no reinforcing material is 60–140 g crosswise and 30–90 g longitudinally, but when a reinforcing material is laminated to the sheet, its tear strength is improved to 600–1,500 g both crosswise and longitudinally.

In the case of the package of this invention comprising said air-permeable sheet (a) and a porous composite film (b) consisting of a resin layer having a lower softening point than said plastic fiber and a resin layer having a higher softening point than the plastic fiber, in which said air-permeable sheet is bonded to the low softening point resin layer side of said porous composite film to form a packaging material and a pair of such packaging materials are joined with the air-permeable sheet positioned on the inside and are heat sealed edgewise with an oxygen absorbent packed therein, such package has the following advantage over the conventional oxygen absorbent packages.

In the case of the conventional oxygen absorbent packages comprising a laminate of a microporous film and a porous low softening point resin film, when they are used in a retort pouch, the oil contained in the retort food is impregnated into the packaging material to deprive the oxygen absorbent therein of its oxygen absorbing or removing ability.

The package of this invention permits no impregnation of oil contained in the food in the packaging material, so that it retains its oxygen absorbing capacity and therefore can maintain its food preserving effect unchanged. Further, the oxygen absorbent package of this invention will not be broken even when subjected to a high-temperature heat sterilization treatment, and thus it can be ideally applied to preservation of retort foods.

When retort food is prepared by using the oxygen absorbent package of this invention, the oxygen concentration in the gas-barrier pouch can be maintained less than 0.1% during storage, so that by use of the oxygen absorbent package of this invention, it is possible to prevent germination and growth of the spores of thermophilic bacteria in retort food and to keep the food safe from oxidation of oil and fat contained therein, discoloration and change of quality such as taste, thus enabling long-time storage of retort foods.

What is claimed is:

1. An oxygen absorbent package comprising a package made of an oxygen absorbent packed in said package and a packaging material which is at least partly formed from an air-permeable sheet obtained by making a sheet from plastic fiber by wet processing of the plastic fiber, drying the sheet, impregnating the sheet with a fluorine resin and pressing the resin-impregnated sheet by heated rolls.

2. A package according to claim 1 wherein the size of the width of said fiber is $50\mu$ or less, and the fiber length is 0.1 to 200 mm.

3. A package according to claim 1 wherein the amount of fluorine resin impregnated in the sheet is 0.1 to 10 parts by weight to 100 parts by weight of said plastic fiber.

4. A package according to claim 1 wherein pressing of the resin-impregnated sheet by heated rolls is carried out at a temperature of 120° to 140° C. under a pressure of 0.5 to 6 kg/cm$^2$.

5. A package according to claim 1 wherein the thickness of said air-permeable sheet is 1 mm or less.

6. A package according to claim 1 wherein said air-permeable sheet is laminated with a reinforcing material.

7. A package according to claim 6 wherein said reinforcing material comprises yarns obtained by cutting a stretched or non-stretched film made by bonding a low-density polyethylene having a melting point of 120° C. or below, an ethylene-vinyl acetate copolymer or an ethylene-acrylic ester copolymer to both sides of a high-density polyethylene film, said yarns being interwoven into a lattice pattern and fusion bonded to each other.

8. A package according to claim 6 wherein lamination of said air-permeable sheet and said reinforcing material is accomplished by hot press using heated rolls.

9. A package according to claim 1 wherein said air-permeable sheet is laminated with a porous low softening point resin film, and the laminate is tucked in with said low softening point resin film positioned on the inside and is heat sealed edgewise.

10. A package according to claim 9 wherein said low softening point resin film is selected from the group consisting of polyethylene film, vinyl acetate copolymer film and ionomer film.

11. A package according to claim 1 comprising a packaging material prepared by bonding said air-permeable sheet to the low softening point resin layer side of a composite film formed by laminating a resin layer having a lower softening point than the plastic fiber constituting said air-permeable sheet and a resin layer having a higher softening point than said plastic fiber, said packaging material being formed into a package so that said air-permeable sheet side forms the inner surface.

12. A package according to claim 11 wherein said composite film is porous.

13. A package according to claim 12 wherein the resin constituting the low softening point resin layer of said porous composite film is selected from the group consisting of polyethylene, polypropylene, ethylene-vinyl acetate copolymer and ethyl acrylate-ethylene copolymer, and the resin constituting the high softening point resin layer of said composite sheet is nylon or polyethylene terephthalate.

14. A package according to claim 12 wherein the thickness of said composite film is $300\mu$ or less.

15. A package according to claim 12 wherein the porosity of said porous composite film is 1 to 30%.

16. A package according to claim 12 wherein the size of openings of said porous composite film is 10 mm or less and the number of openings is 100 openings/m$^2$.

17. A package according to claim 12 wherein said composite film is perforated by irradiation of laser beams.

18. A package according to claim 11 wherein the resin constituting the low softening point resin layer of said porous composite sheet is selected from the group consisting of polyethylene, polypropylene, ethylene-vinyl acetate copolymer, and ethyl acrylate-ethylene copolymer, and the resin constituting the high softening point resin layer of said composite sheet is nylon or polyethylene terephthalate.

19. A package according to claim 11 wherein the thickness of said composite film is 300µ or less.

20. A package according to claim 1 comprising a pair of laminates each including of said air-permeable sheet, a composite film made by laminating a resin layer having a lower softening point than said plastic fiber constituting said air-permeable sheet and a resin layer having a higher softening point than said plastic fiber, and a porous resin film having a lower softening point than said plastic fiber, in which laminate the low softening point resin layer side of said composite film opposes said porous resin film with said air-permeable sheet interposed therebetween, said pair of laminates being joined together so that the low softening point resin sides of the respective laminates face each other.

21. A package according to claim 20 wherein said composite film is porous.

22. A package according to claim 21 wherein the size of openings of said porous composite film is 10 mm or less, and the number of openings is more than 100 openings/m$^2$.

23. A package according to claim 21 wherein the porosity of said porous composite film is 1 to 30%.

24. A package according to claim 21 wherein said composite film is perforated by irradiated of laser beams.

25. A package according to claim 21 wherein the resin constituting the low softening point resin layer of said porous composite sheet is selected from the group consisting of polyethylene, polypropylene, ethylene-vinyl acetate copolymer, and ethyl acrylate-ethylene copolymer, and the resin constituting the high softening point resin layer of said composite sheet is nylon or polyethylene terephthalate.

26. A package according to claim 21 wherein the thickness of said composite film is 300µ or less.

27. A package according to claim 20 wherein the resin constituting the low softening point resin layer of said porous composite sheet is selected from the group consisting of polyethylene, polypropylene, ethylene-vinyl acetate copolymer, and ethyl acrylate-ethylene copolymer, and the resin constituting the high softening point resin layer of said composite sheet is nylon or polyethylene terephthalate.

28. A package according to claim 20 wherein the thickness of said composite film is 300 µ or less.

* * * * *